July 10, 1962 R. S. SLAWSON 3,043,325
PRESSURE RELAY
Filed April 27, 1960

*INVENTOR.*
RICHARD S. SLAWSON
BY
*Barlow & Barlow*
ATTORNEYS

United States Patent Office 3,043,325
Patented July 10, 1962

3,043,325
PRESSURE RELAY
Richard S. Slawson, Barrington, R.I., assignor to George W. Dahl Company, Inc., a corporation of Rhode Island
Filed Apr. 27, 1960, Ser. No. 25,034
1 Claim. (Cl. 137—112)

This invention relates to a fast acting valve relay for use in connection with fluids which may either be liquid or gas.

It is frequently desired in pneumatic control apparatus or hydraulic control apparatus to provide a means whereby an instantaneous change of condition may be effected. For instance, it is sometimes desirable to select from two sources the highest relative pressure between these sources. There are available certain types of differential pressure controllers but usually they are formed of a diaphragm which in effect forms a wall or partition between the two pressures. When one pressure exceeds the other by a certain amount, the diaphragm will move and open some mechanical valve or other means. The difficulty with this arrangement is that it is quite slow acting and further will not adequately sense small differences in pressure such as on the order of 1 lb. per square inch differential.

It is therefore an object of the present invention to provide a mechanism which will instantaneously change position after a preset pressure differential has been attained and which will instantaneously cause the valve parts to be moved to full open or closed position.

It is another object of the invention to provide a valve control means of a construction such that the fluid to be controlled will readily move parts in one direction and seal off a passageway.

A more specific object of the invention is to provide an O-ring pressure selector which will automatically locate and distribute a source of supply pressure to an end use.

With these and other objects in view, the invention consists of certain novel features of construction as will be more fully described and particularly pointed out in the appended claim.

Figure 1:
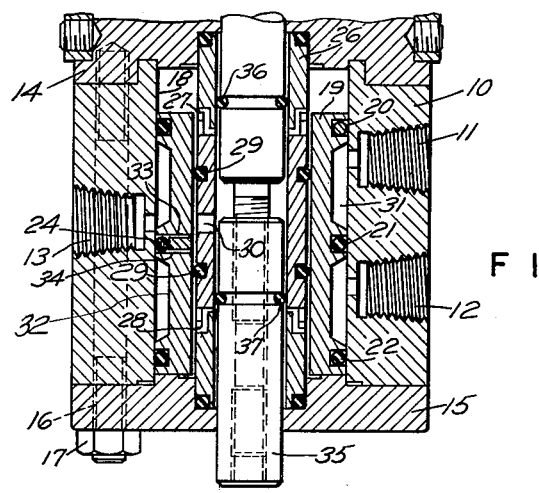
FIG. 1 is a cross sectional view of a fast acting relay made in accordance with the teachings of this invention.

Referring now to the drawings and particularly FIG. 1, I have shown a fast acting relay which comprises a cylindrical body 10 that is provided with three ports therethrough identified as 11, 12 and 13. The ports 11 and 12 may be considered inlet ports while the port 13 may be considered an outlet port and they are arranged in spaced relationship so that ports 11 and 12 are located on different levels in the body 10 and port 13 is located on a medium level therein. Two end caps 14 and 15 are provided for closing off the cylindrical body 10 at either end thereof and may be held in position by a plurality of studs 16 with nuts 17. The cylindrical body 10 defines an inner bore 18 in which is located a free floating piston 19. This piston 19 is a cylinder provided on the outer periphery thereof with three O-ring grooves 20, 21 and 22 which are longitudinally spaced from each other, grooves 20 and 22 being adjacent the ends of the piston 19 and groove 21 being centrally thereof. Into each groove an O-ring is fitted, the O-rings engaging the bore 18 while between these grooves annular recesses 31, 32 are formed. It should also be noted that the length of the piston 19 is less than the distance between the inner face of the end caps 14 and 15 so that the piston 19 is permitted longitudinal movement sufficient to orient the O-ring groove 21 to either side of the port 13 disposed in the body 10.

Within the center of the cylindrical piston 19 is a fixed cylindrical spool 26 which is provided near either end thereof with bleed holes 27, 28. The spool 26 is sealingly received in recesses provided in the end caps 14 and 15 and intermediate the ends of the spool 26 there are disposed in suitable grooves O-rings 29, while centrally of the spool a port 30 is formed. Within the spool 26 there is disposed a center operating stem 35 which passes through the end caps 14 and 15 and which has located thereon two spaced O-rings 36 and 37.

For an understanding of how the various parts cooperate one with another, we shall assume that a fluid under pressure is being directed to ports 11 and 12. We shall further assume that the differential pressure relationship between these two fluids is such that it is greater at port 11 than it is at port 12. This action will then place the parts of the relay in the position shown in FIG. 1. Further the operating stem 35 will be considered to be in the rest position. With these conditions assumed it will be seen that the O-ring 36 on the operating stem 35 is located above the bleed hole 27. Also it will be noted that the O-ring 24 is located in the lower part of groove 21 permitting a passage from annular recess 31 through passageway 33. Thus, the fluid pressure at port 11 is permitted to flow around recess 31 in the piston 19 and thence through passageway 33, port 30, and into the area between the O-rings 36 and 37 of the center stem 35. Accordingly the fluid exerting the higher pressure is permitted to pass through the bleed hole 27, and exert a pressure on the free floating piston 19 at the upper end thereof. If a different condition is desired, that is if the operator desires to select the fluid appearing at port 12, the center operating stem 35 will be moved downward thereby cutting off the line pressure from the top end of the free floating piston 19 and at the same time opening the path for the line pressure to go down by the center stem through the lower bleed hole 28 and so on onto the bottom of the free floating piston 19 forcing the piston 19 upwardly. When the upper travel of piston 19 has been reached, the position of the O-ring 24 will remain the same as before as long as the highest pressure is at port 11 and thus higher pressure now passes through bleed hole 28. Communication is now had from part 12 via recess 32 to port 13. The setting of the point of switching between the two pressures can be achieved roughly in the following manner. We noted that the central stem 35 is made of two distinct parts permitting an adjustment of relative distance between the O-rings 36 and 37 relative one to the other. Thus the relationship between the lower O-ring 37 and the bleed passageway 28 can be fixed relative to the amount of movement of the stem 35. In this way a trip point can be fixed with a minimum band of 1 lb. per square inch differential upwardly to a much larger differential pressure on the order of 12 to 15 lbs.

Additionally, an automatic change-over can be had in this relay if the pressure differential between ports 11 and 12 is changed. To this end, let us assume that the ports are in the position shown in FIG. 1 under the same conditions just enumerated. Now if the pressure at port 12 becomes greater than that at port 11, the O-ring 24 will be moved from the position shown in FIG. 1 to a position so that passageway 33 and communication with recess 31 is blocked off. In this fashion the O-ring 24 acts as a pressure selector and insures that the highest of the pressures at ports 11, 12 is at all times available for the operation of the piston 19 in accordance with the dictates of operating stem 35.

Figure 2:
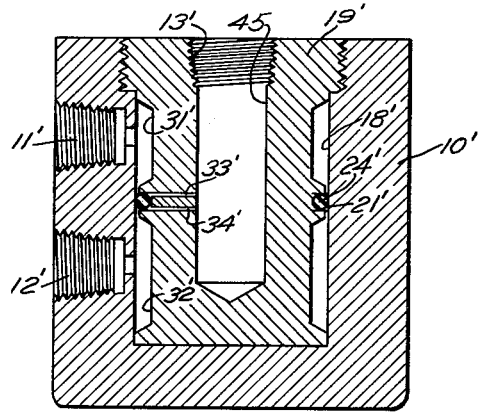
FIG. 2 is a cross sectional view of a supply pressure distributor made in accordance with the teachings of this invention.
Figure 3:
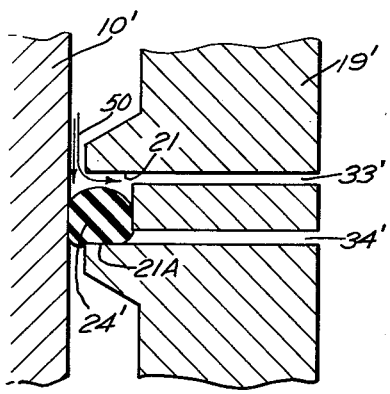
FIGS. 3 and 4 are enlarged cross sectional views showing the action of the O-ring selector valve.
Figure 4:
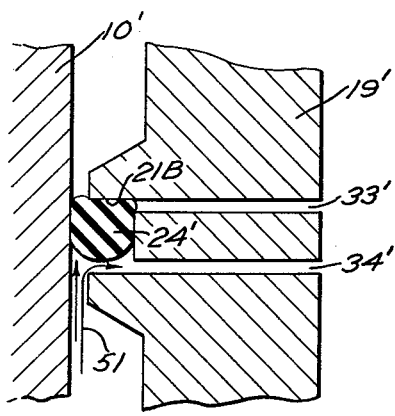

In FIGS. 2, 3 and 4 there is shown an application of a pressure selecting device utilizing a feature of the above fast acting relay, like parts bearing the same reference numerals primed. Referring particularly to FIG. 2, I have shown schematically a body 10' which has a bore 18' receiving a plug 19'. The plug 19' is provided with a central groove 21' which receives an O-ring 24', the O-ring 24' being made slightly smaller than the width of the groove 21'. Also the plug is provided with two recesses 31', 32' either side of the O-ring groove 21' and a central bore 45. Passageways 33' and 34' are drilled between the bottom of the groove 21' and the bore 45 at either edge of the groove. The body 10' is provided with two spaced ports therein 11' and 12' which basically open into the recesses 31', 32'.

To understand the action of this particular device, let us assume that we are supplying a fluid such as air to the ports 11' and 12'. If the pressure at the port 11' is greater than that at port 12', the O-ring 24' will position itself as is shown in FIG. 3. This comes about since the differential pressure is greater at port 11' and forces the O-ring to seat against the lower edge of the groove 21' as at 21A. With the O-ring 24' so seated, it will be seen by referring to FIG. 3 that the passageway 34' is blocked off as is the groove 21' blocked off from communication with the port 12'. Fluid under pressure can then enter through port 11' as shown by the arrows 50 and pass on through the passageway 33' into the bore 45 and thence out the port 13' of bore 45. Any reversal in pressure differential will cause an action such as shown in FIG. 4 of the drawings wherein the O-ring 24' is now seated against face 21B of the groove 21' permitting air under pressure as shown by the arrows 51 of flow out passageway 34' from the port 12'.

This apparatus is quite useful as a pressure distributor in that it permits one to determine which end of a double acting piston will receive a supply pressure by merely venting the opposite end of the same piston to atmosphere. Since the venting of one end or the other of a double acting piston can be accomplished by a simple 3-way valve of small capacity, it will be apparent to those skilled in the art that one is permitted to pilot a double-acting piston by means of a three-way valve and the device of FIGURE 2 with supply pressure fed to port 13' instead of utilizing the more complicated four-way valve that has heretofore normally been used.

I claim:

A high pressure selector valve comprising a cylindrical part having a pair of fluid passageways, a body part receiving said cylindrical part for relative movement therebetween, said body having a pair of spaced ports on either side of said passageways, each passageway communicating with a port in said body, an annular groove formed in one of said parts and facing the other part, said groove communicating with each of said ports, said passageways opening into said groove at opposite sides thereof, the interior of said cylindrical part defining a bore communicating with said passageways, a resilient sealing element in said groove in engagement with said parts, said sealing element having a dimension in cross section less than the width of the groove and being yieldably movable therein under fluid pressure from said ports so as to engage the sides of the groove adjacent the passageways and select for flow to the bore the highest of the two pressures appearing at the two parts, an operating stem and a spool surrounding said stem disposed in said bore, said cylindrical part having means sealing the end portions thereof to the body part, said spool having a central port therein, O-rings sealing the spool to the bore at either side of the central port, a pair of bleed passageways opening through the spool remote from the central port and on the other side of said O-rings, means disposed on said stem for selectively sealing off said bleed passageways forcing said cylindrical part to reciprocate in said body by applying fluid pressure to an end portion thereof.

References Cited in the file of this patent

UNITED STATES PATENTS

| | | |
|---|---|---|
| 2,360,839 | Barksdale | Oct. 24, 1944 |
| 2,627,388 | Johnson et al. | Feb. 3, 1953 |
| 2,703,558 | Wilcox | Mar. 8, 1955 |
| 2,778,373 | Jaquith | Jan. 22, 1957 |